US012804732B2

(12) United States Patent
Halappa et al.

(10) Patent No.: US 12,804,732 B2
(45) Date of Patent: Nov. 17, 2026

(54) AUTOMATIC ISOCHRONOUS ADAPTION LAYER MODE SWITCHING

(71) Applicant: Intel Corporation, Santa Clara, CA (US)

(72) Inventors: Mohan Kumar Halappa, Bangalore (IN); Oren Haggai, Kefar Sava (IL); Srinivas Krovvidi, Hyderabad (IN)

(73) Assignee: INTEL PRODUCTS IP LLC, Santa Clara, CA (US)

( * ) Notice: Subject to any disclaimer, the term of this patent is extended or adjusted under 35 U.S.C. 154(b) by 372 days.

(21) Appl. No.: 18/391,757

(22) Filed: Dec. 21, 2023

(65) Prior Publication Data

US 2025/0024524 A1 Jan. 16, 2025

(30) Foreign Application Priority Data

Jul. 12, 2023 (EP) .................................... 23184982

(51) Int. Cl.
*H04W 76/10* (2018.01)

(52) U.S. Cl.
CPC .................................. *H04W 76/10* (2018.02)

(58) Field of Classification Search
CPC ............. H04W 76/10; H04W 52/0235; H04W 52/0245; H04W 84/18; H04W 4/80; H04W 52/02; H04W 24/02
See application file for complete search history.

(56) References Cited

U.S. PATENT DOCUMENTS

2022/0078541 A1* 3/2022 Zhu ......................... H04W 4/38
2025/0024541 A1* 1/2025 Ikeda .................... H04L 5/0053

FOREIGN PATENT DOCUMENTS

CN 116233812 A 6/2023
WO 2023017407 A1 2/2023

OTHER PUBLICATIONS

Extended European Search Report for corresponding European Patent Application No. 23184982, dated Dec. 1, 2023, 9 pp. 9 (for informational purposes only).

Woolley, Martin; "Bluetooth Core Specification Version 5.2 Feature Overview"; retrieved from https://bluetooth.com/wp-content/uploads/2020/01/Bluetooth_5.2_Feature_Overview.pdf on Dec. 8, 2023; dated Dec. 9, 2020; 37 pages.

* cited by examiner

*Primary Examiner* — Fayyaz Alam

(74) *Attorney, Agent, or Firm* — VIERING, JENTSCHURA & PARTNER MBB

(57) ABSTRACT

Disclosed herein are devices, methods, and systems for automatically switching a mode of the isochronous adaption layer. The system establishes a connection group via a wireless transceiver, where the connection group includes a listening device and another device. The wireless transceiver may transmit data packets to the connection group using a communication connection in a data packet mode. The system may determine a reconfiguration of the communication connection based on an activity status of the other device within the connection group, wherein the reconfiguration comprises changing the data packet mode of the communication connection to a second data packet mode. The system may then cause the wireless transceiver to transmit the data packets over the communication connection in the second data packet mode.

19 Claims, 3 Drawing Sheets

AUTOMATIC ISOCHRONOUS ADAPTION LAYER MODE SWITCHING

CROSS-REFERENCE TO RELATED APPLICATIONS

This application claims priority to European Patent Application No. 23 184 982.9 filed on Jul. 12, 2023, the contents of which are fully incorporated herein by reference.

TECHNICAL FIELD

This disclosure relates generally to wireless communication systems, and in particular, to streaming audio over wireless communications systems such as Bluetooth that may utilize, for example, an isochronous adaption layer.

BACKGROUND

In wireless audio streaming, such as with Bluetooth low energy (LE), a user may connect a listening device (such as a hearing aid, headphones, a speaker, a headset, etc.) via a Bluetooth LE connection to a host device (such as a computer, laptop, smartphone, etc.) in order to stream music and/or make voice calls while using the listening device for audio. In such a case, the Bluetooth LE specification defines different types of audio streaming configurations that depend on whether other devices are present in the audio source's piconet (e.g., a group of devices (CIG) that share the same channel to the host).

When no other devices are connected in the same group, the audio stream communication configuration with the listening device may use an "unframed" communication mode. In unframed communication mode, audio service data unit (SDU) frames are received at 10 millisecond (ms) intervals and sent to the listening device at an isochronous (ISO) interval of 10 ms (e.g., defined at the ISO adaption layer, ISOAL). To the extent other devices (e.g., a Bluetooth keyboard and/or mouse) are connected to the computer/laptop in the same group as the listening device, the audio stream configuration for the listening device may use an "unsegmented framed" mode (also called "framed, unsegmented mode"), where SDU frames received at 10 ms are sent to the listening devices at a 7.5 ms ISO interval, without any SDU segmentation.

When an audio stream is operating in unsegmented framed mode, this may add an extra 5 bytes of data that may need to be transmitted by the source (e.g., the computer/laptop) and received by the listening device in order to comply with the 7.5 ms interval. This may cause unnecessary power consumption by both the listening device and the computer/laptop.

BRIEF DESCRIPTION OF THE DRAWINGS

In the drawings, like reference characters generally refer to the same parts throughout the different views. The drawings are not necessarily to scale, emphasis instead generally being placed upon illustrating the exemplary principles of the disclosure. In the following description, various exemplary aspects of the disclosure are described with reference to the following drawings, in which.

DESCRIPTION

Figure 1:
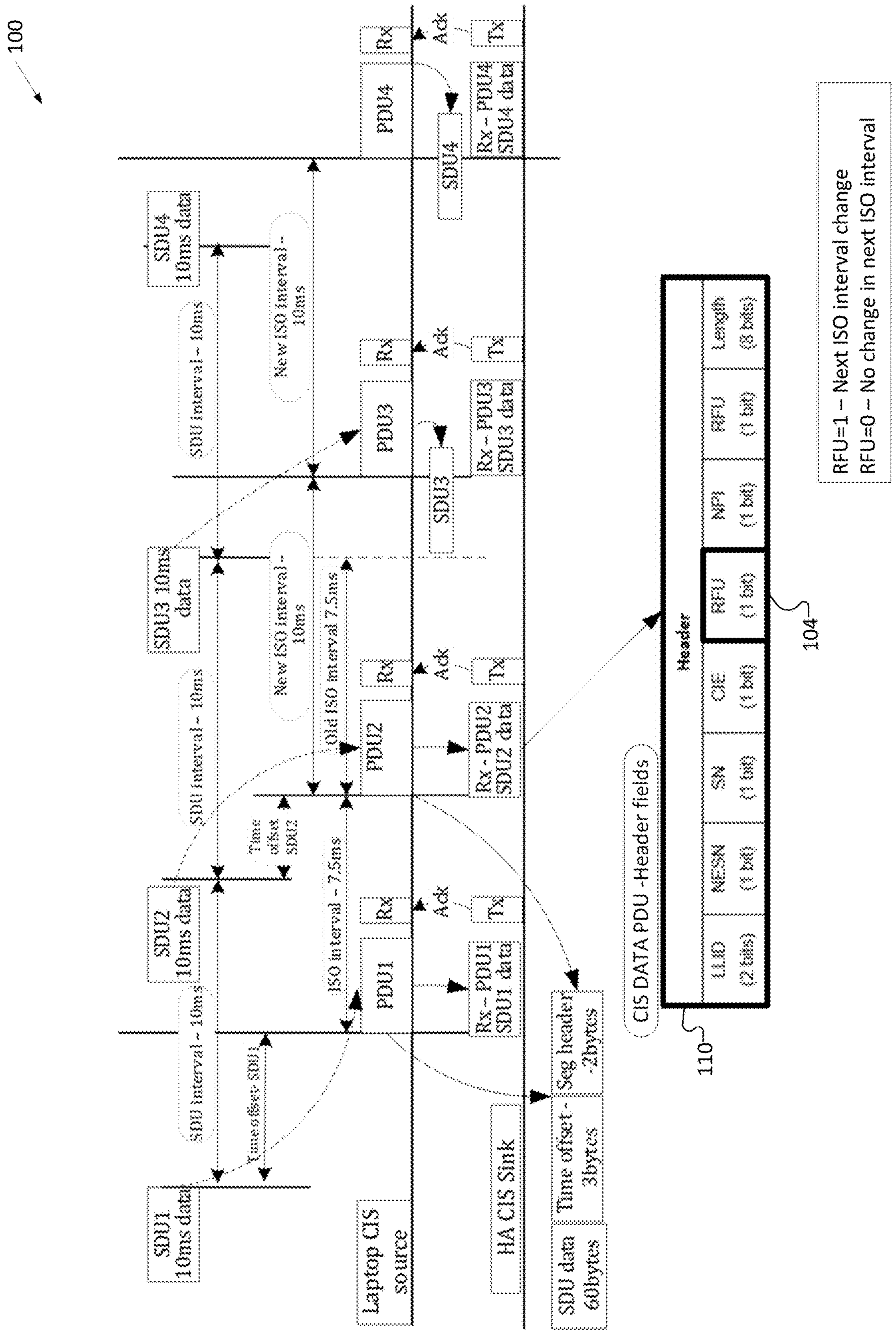
FIG. 1 shows an exemplary flow diagram of source data unit (SDU) and protocol data unit (PDU) as between a source device/host and a listening device that automatically switches a mode of the isochronous adaption layer.

The following detailed description refers to the accompanying drawings that show, by way of illustration, exemplary details and features.

The word "exemplary" is used herein to mean "serving as an example, instance, or illustration." Any aspect or design described herein as "exemplary" is not necessarily to be construed as preferred or advantageous over other aspects or designs.

Throughout the drawings, it should be noted that like reference numbers are used to depict the same or similar elements, features, and structures, unless otherwise noted.

The phrase "at least one" and "one or more" may be understood to include a numerical quantity greater than or equal to one (e.g., one, two, three, four, [ . . . ], etc.). The phrase "at least one of" with regard to a group of elements may be used herein to mean at least one element from the group consisting of the elements. For example, the phrase "at least one of" with regard to a group of elements may be used herein to mean a selection of: one of the listed elements, a plurality of one of the listed elements, a plurality of individual listed elements, or a plurality of a multiple of individual listed elements.

The words "plural" and "multiple" in the description and in the claims expressly refer to a quantity greater than one. Accordingly, any phrases explicitly invoking the aforementioned words (e.g., "plural [elements]", "multiple [elements]") referring to a quantity of elements expressly refers to more than one of the said elements. For instance, the phrase "a plurality" may be understood to include a numerical quantity greater than or equal to two (e.g., two, three, four, five, [ . . . ], etc.).

The phrases "group (of)", "set (of)", "collection (of)", "series (of)", "sequence (of)", "grouping (of)", etc., in the description and in the claims, if any, refer to a quantity equal to or greater than one, i.e., one or more. The terms "proper subset", "reduced subset", and "lesser subset" refer to a subset of a set that is not equal to the set, illustratively, referring to a subset of a set that contains less elements than the set.

The term "data" as used herein may be understood to include information in any suitable analog or digital form, e.g., provided as a file, a portion of a file, a set of files, a signal or stream, a portion of a signal or stream, a set of signals or streams, and the like. Further, the term "data" may also be used to mean a reference to information, e.g., in the form of a pointer. The term "data", however, is not limited to the aforementioned examples and may take various forms and represent any information as understood in the art.

The terms "processor" or "controller" as, for example, used herein may be understood as any kind of technological entity (e.g., hardware, software, and/or a combination of both) that allows handling of data. The data may be handled according to one or more specific functions executed by the processor or controller. Further, a processor or controller as used herein may be understood as any kind of circuit, e.g., any kind of analog or digital circuit. A processor or a controller may thus be or include an analog circuit, digital circuit, mixed-signal circuit, software, firmware, logic circuit, processor, microprocessor, Central Processing Unit (CPU), Graphics Processing Unit (GPU), Digital Signal Processor (DSP), Field Programmable Gate Array (FPGA), integrated circuit, Application Specific Integrated Circuit (ASIC), etc., or any combination thereof. Any other kind of implementation of the respective functions, which will be described below in further detail, may also be understood as a processor, controller, or logic circuit. It is understood that any two (or more) of the processors, controllers, or logic circuits detailed herein may be realized as a single entity with equivalent functionality or the like, and conversely that any single processor, controller, or logic circuit detailed herein may be realized as two (or more) separate entities with equivalent functionality or the like.

As used herein, "memory" is understood as a computer-readable medium (e.g., a non-transitory computer-readable medium) in which data or information can be stored for retrieval. References to "memory" included herein may thus be understood as referring to volatile or non-volatile memory, including random access memory (RAM), read-only memory (ROM), flash memory, solid-state storage, magnetic tape, hard disk drive, optical drive, 3D XPoint™, among others, or any combination thereof. Registers, shift registers, processor registers, data buffers, among others, are also embraced herein by the term memory. The term "software" refers to any type of executable instruction, including firmware.

Unless explicitly specified, the term "transmit" encompasses both direct (point-to-point) and indirect transmission (via one or more intermediary points). Similarly, the term "receive" encompasses both direct and indirect reception. Furthermore, the terms "transmit," "receive," "communicate," and other similar terms encompass both physical transmission (e.g., the transmission of radio signals) and logical transmission (e.g., the transmission of digital data over a logical software-level connection). For example, a processor or controller may transmit or receive data over a software-level connection with another processor or controller in the form of radio signals, where the physical transmission and reception is handled by radio-layer components such as radio frequency (RF) transceivers and antennas, and the logical transmission and reception over the software-level connection is performed by the processors or controllers. The term "communicate" encompasses one or both of transmitting and receiving, i.e., unidirectional or bidirectional communication in one or both of the incoming and outgoing directions. The term "calculate" encompasses both "direct" calculations via a mathematical expression/formula/relationship and 'indirect' calculations via lookup or hash tables and other array indexing or searching operations.

Details of the Bluetooth low energy (LE) standard, and more particularly, the ISO adaption layer (ISOAL), may be found in the Bluetooth standard. See, e.g., Bluetooth Core Specification, v. 5.2 (Dec. 31, 2019) (see Volume 6, Part G for a discussion of the ISOAL). As should be understood from the description below, the automatic mode switching discussed herein is not limited to this particular version of Bluetooth, and the automatic mode switching may be applied to any future version of the Bluetooth standard.

As noted above, when using a Bluetooth low energy connection to stream audio data to connected audio devices, the communication connection may be set up as an "unframed" communication mode or "framed" communication mode. In unframed communication mode, audio service data unit (SDU) frames may be received at 10 millisecond (ms) intervals and sent to the listening device at an isochronous (ISO) interval of 10 ms. In a framed, unsegmented communication mode, SDU frames may be received at 10 millisecond (ms) intervals and sent to the listening device at an ISO interval of 7 ms.

When there are other device connected to the host via a Bluetooth LE communication protocol (e.g., a Bluetooth LE keyboard and/or mouse) in the same group as a listening device, the audio stream configuration for the listening device may be required to match the connection interval of other device(s) (e.g., a connection interval of 7.5 ms) in the group even though the SDU frames with the audio stream are received at 10 ms. The is because, for example, groups of Bluetooth LE devices would typically communicate with the same connection interval. This may result, however, in wasted transmissions (and therefore wasted power, wasted bandwidth, etc.) in situations where the other device(s) in the group may not be actively communicating data over the Bluetooth connection (e.g., when the other device(s) are in a low energy, low power, or inactive state). In such cases, the listening device would be configured with a faster ISO interval (e.g., 7.5 ms) than its audio stream is arriving (e.g., 10 ms).

Using a keyboard as an example of a device that is connected in the same Bluetooth group as a hearing aid, for example, the keyboard may switch to a low energy/power mode when the user of the keyboard has not actively typed on the keyboard for some time. In such cases, the keyboard may have a reduced data communication demand when in low energy/power mode (e.g., because there are no new keypresses that need to be transmitted from the keyboard to the host computer). As a result of the lower data communication demands, the keyboard would not need to communicate at the faster connection interval (e.g., 7.5 ms). Nevertheless, because the isochronous interval for the listening device in the same group is also at the faster ISO interval, the listening device may be sending data packets more frequently than is necessary, considering the interval at which the audio stream is being provided and the current state of the other devices in the group. This may add an extra 5 bytes of data in order for the host to transmit to the listening device at a 7.5 ms interval. As result, there may be a significant amount of unnecessary power consumption by both the listening device and the host device.

The disclosed automatic mode switching, discussed in more detail below, automatically switches the communication mode dynamically between a framed communication mode (e.g., at a first ISO interval) and an unframed communication mode (e.g., at a second ISO interval) based on whether there are other device(s) in the same group as the listening device and based on the current state of operation of those other device(s) (e.g., whether the other device(s), such as a Bluetooth-connected keyboard and/or mouse, are in an idle state). By automatically switching to an unframed communication mode (with, e.g., a slower ISO interval) when other devices in the group are idle, the automatic switching may provide significant power savings for the listening device (e.g., especially for a listening device that operates from a small battery, such as a hearing aid running on a coin-cell battery) as well as the for the host (e.g., the computer/laptop).

Current methods for streaming audio over a Bluetooth LE connection to a listening device may result in inefficient communication when the other connected devices in the group are in an inactive state, idle state, or low-power mode. One way the listening device may switch to using the more efficient unframed mode (where the ISO interval matches the interval at which SDU frames are received), is to disconnect from the group and reestablish a new connection for the listening device so that the communication parameters may use unframed mode. However, this type of disconnecting and reconnected may be time consuming, meaning that the audio stream may need to be paused while the new connection is established. This may result in audio glitches (such as delayed or lost audio) during the disconnecting and reconnecting, and ultimately, this may lead to a bad user experience with respect to the streaming audio.

The automatic mode switching method disclosed herein may reduce these problems and inefficiencies by dynamically adjusting the frame interval (e.g., from an unsegmented framed mode to an unframed mode) based on an activity status of the devices in the group, without disconnecting/reconnecting the group of devices. If the other devices in the group are operating in a low power mode, inactive state, or idle state, a longer connection interval may be used (and, e.g., the listening device set to unframed mode). If the other devices in the group are in a normal, active, or non-idle state, the frame interval may be switched back to the shorter connection interval (and, e.g., the listening device set to unsegmented framed mode). In this manner, power is not wasted to communicate at an interval that is faster than necessary for communicating the audio stream to the listening device, and audio glitches are not caused by disconnected/reconnecting the group of devices.

Using a typical computer/laptop as an example, when additional Bluetooth-connected devices such as a keyboard/mouse are connected or disconnected from a computer while the listening device is streaming audio over Bluetooth (e.g., during an audio call streamed to a Bluetooth-connected hearing aid), conventional methods may pause the audio, disconnect the connected isochronous stream (CIS) devices associated with the group (CIG), and reestablish connections with a new set of CIG parameters for the framed/unframed communication mode and corresponding ISO interval of 10 ms/7.5 ms. As noted above, disconnecting and reestablishing may take some time and may therefore result in audio glitches (such as delayed or lost audio) and ultimately a bad user experience.

By contrast, automatic mode switching of the audio streaming mode between unsegmented framed mode (e.g., at a faster ISO interval) and unframed mode (e.g., at a slower ISO interval) based on the presence and/or state of other Bluetooth-connected devices (e.g., such as a mouse or keyboard) in the group may provide a seamless way of taking advantage of the idle state of other devices in the group to reduce the power consumption of the streaming audio connection.

For example, when a Bluetooth-connected keyboard or mouse enters into a low power mode (e.g., is not actively in use), the source device (e.g., to which the listening device is also connected) may request a communication mode switch that will switch the audio streaming mode from unsegmented framed communication mode to unframed communication mode. Similarly, when the Bluetooth-connected keyboard or mouse is connected or disconnected, the audio streaming mode may dynamically switch between unsegmented framed communication mode and unframed communication mode. This automatic mode switching may allow the listening device (such as a hearing aid device that may have a small form factor, is expected to operate from a battery for a long time, and is therefore cautious about power consumption) to save power and thus improve battery life. This automatic mode switching may also reduce power consumption of the host/source computer and may improve its battery life, which may be particularly helpful, for example, if the computer is a battery-powered laptop. This automatic mode switching may also provide an improved audio experience, where there may not need to be a lengthy process for pausing the audio, disconnecting all the connected isochronous stream (CIS) devices associated with the group (CIG), and reestablishing the connections with new set of CIG parameters for the framed/unframed communication mode and the corresponding ISO interval of 10 ms/7.5 ms.

The disclosed automatic mode switching may be implemented as follows. When no other Bluetooth-connected devices are connected to a host (e.g., the audio source such as a computer, laptop, smartphone, etc.), the audio stream configuration for the Bluetooth-connected listening device (e.g., a hearing aid) may use unframed mode for the communication connection. In unframed mode, audio SDU frames are received at a 10 ms interval and are transmitted over the communication connection to the listening device at an ISO interval of 10 ms. If an additional Bluetooth device is connected (e.g. a keyboard or mouse) to the group (e.g., a shared communication connection), the audio stream configuration may switch to unsegmented framed mode. In unsegmented framed mode, the SDU frames are received at 10 ms interval and are transmitted over communication connection to the listening device at an ISO interval of 7.5 ms without segmentation.

The disclosed automatic mode switching may utilize two modes that define the communication connection and in particular, the interval of audio communication as between the listening device and the source (e.g., the host device from which the audio is being sourced and to which the listening device has a Bluetooth connection). The audio communication configuration may switch between the two modes (e.g., between mode 1 and mode 2), depending on whether another device is connected and its state of operation:

| Mode | ISO interval | SDU interval | Framed? | Unsegmented? |
|---|---|---|---|---|
| Mode 1 | 10 ms | 10 ms | No | No |
| Mode 2 | 7.5 ms | 10 ms | Yes | Yes |

As should be understood, the two modes are merely exemplary, and other modes may be defined that include different combinations of ISO intervals, SDU intervals, and whether the communication is framed/unframed or unsegmented/not unsegmented.

When there are no other Bluetooth-connected devices in the group, the host may transmit the audio stream to the listening device using mode 1 (e.g., unframed mode, where the audio stream has a 10 ms SDU frame duration and the data packets are transmitted at a 10 ms ISO interval). Thus, the music or voice audio frames are sent to the listening device in unframed mode unless or until an additional Bluetooth device in the group is connected. While the audio is still streaming, the transfer of audio data packets to the listening device is able to switch dynamically and automatically to mode 2 (e.g., unsegmented, framed mode, where 10 ms SDU frames are sent over 7.5 ms ISO interval) if an additional device is connected.

To indicate this automatic mode switching, the system may use reserved bit(s) in a CIS data header of a protocol data unit (PDU) (e.g., the RFU bit). For example, the source may set the reserved bit to 0x01, which may indicate a mode switch between unframed mode (mode 1) and framed mode (mode 2) for the next ISO interval. If communication with the listening device is currently in unframed mode (mode 1), a reserved bit of 0x01 in the CIS data header of the PDU may indicate a switch to framed mode (mode 2) for the next ISO interval. If communication with the listening device is currently in framed mode (mode 2), setting the reserved bit to 0x01 may indicate a switch to unframed mode (mode 1) for the next interval. If the reserved bit is 0x00, this may indicate no mode switch, and the mode for the next interval may stay the same as the current mode.

The disclosed automatic mode switching may also consider the state of the other Bluetooth-connected devices (e.g., that are in the same communication group) to determine whether to switch modes. For example, when user activity on a Bluetooth-connected keyboard or mouse is in a standby state, low-power state, or idle state (e.g., the keyboard or mouse connection enters a low power mode (e.g., based on sniff sub rate in the case of a classic Bluetooth connection or connection sub rating in the case of a LE Bluetooth connection)), the host/source may, for the audio streaming connection to the listing device, initiate a mode switch from mode 2 to mode 1 for the next frame. Once there is an indication of user activity on the Bluetooth-connected keyboard or mouse, the host/source may initiate a mode switch from mode 1 back to mode 2. Because the switching is dynamic, there is no need to pause the audio, disconnect, and reestablish connection(s) in order to change the ISO interval.

The disclosed automatic mode switching may also determine whether to switch modes based on whether the listening device provides an acknowledgement (e.g., an ACK). If the host/source device receives a non-acknowledgement (e.g., a NAK) or does not receive an access code detection from the listening device in response to the indication of the mode switch request (e.g., a mode-switch indicator in the RFU of the header of the CIS data PDU) that was sent from the host/source, the host/source may continue to send the mode-switch indicator as part of the CIS procedure until the acknowledgement is received or until the mode-switch indicator changes due to new conditions at the time of (re) sending the CIS data PDU.

FIG. 1 shows an exemplary flow diagram 100 of SDU and PDU as between a source device (e.g., a computer/laptop from which audio is being streamed and to which Bluetooth devices are connected) and a listening device (e.g., a hearing aid (HA)). As shown in the top row, the SDU arrives at 10 ms intervals, where SDU2 arrives 10 ms after SDU 1, SDU3 arrives 10 ms after SDU2, and SDU4 arrives 10 ms after SDU 3. At the time of transmitting SDU1, assume that another Bluetooth device is part of the group and active, so the ISO interval is 7.5 ms. Thus, the ISO interval of the PDU for the streaming audio is also at 7.5 ms, as shown between PDU2 and PDU1. However, at the time of transmitting SDU2 from the source device, assume that the Bluetooth-connected keyboard or mouse goes to low power mode. As such, the source device may indicate a mode switch to unframed mode for the next SDU (i.e., SDU 3). The indication of a mode switch may be provided in a header field of the next PDU (i.e., in this example, the PDU associated with SDU2, or PDU2, because this is when the other device went to low-power mode). An example header field 110 is shown in FIG. 1, where a reserved bit 104 (RFU) may be used to indicate the mode switch (e.g., setting the reserved bit 104 to 0x01). As should be appreciated, other header formats may be used and other bits may be used to indicate the mode switch. For example, while this example uses a toggle bit as an indication that the mode is to switch for the next frame (e.g., to toggle between two modes), other indications may be used, such as providing a bit code that corresponds to a unique one of a set of possible modes (e.g., 0x00 indicates mode 1 while 0x01 indicates mode 2) to be used for the next frame.

At the hearing aid, the PDU2 may be received (in FIG. 1: Rx-PDU2 of SDU2 data) and may acknowledge its receipt and its agreement to switch modes by transmitting an "ACK". Then, the next SDU (SDU3) may be transmitted in PDU3 at the new ISO interval of 10 ms and using the new communication mode (mode 1, referencing the table above) for the next frame, which is longer than the old ISO interval of 7.5 ms using the old communication mode (mode 2, referencing the table above). Mode 1 communication may continue while the Bluetooth-connected keyboard or mouse remains in low-power mode. Once the Bluetooth-connected keyboard or mouse exits low-power mode, the source device may again indicate a mode switch by setting the reserved bit 104 (RFU) to one (0x01) in order to cause the mode to switch back to the old ISO interval of 7.5 ms (mode 2) for the next frame.

Figure 2:
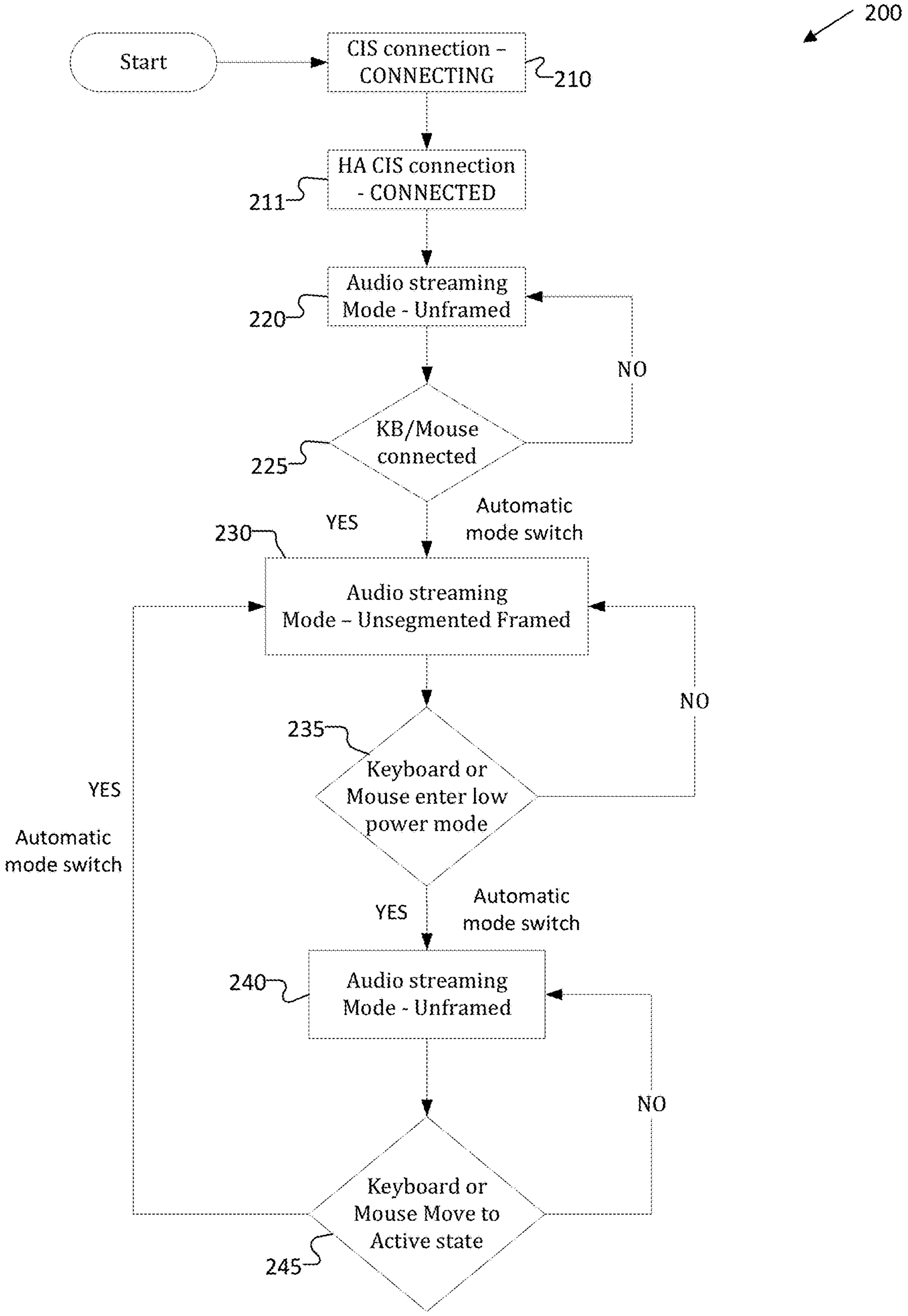
FIG. 2 shows an example flow chart of a listening device's audio connection establishment and automatic mode switching based on the change of state of another Bluetooth-connected device.

FIG. 2 shows an example flow chart 200 of a listening device's audio connection establishment and mode switching based on the change of state of another Bluetooth-connected device. The listening device (in this example, a hearing aid "HA") may establish, at 210 and 211, a communication connection (a CIS connection) with a host device from which audio will be streamed over the connection to the HA. The audio stream may be transmitted, at 220, over the communication connection using unframed mode.

Next, at 225, the host may monitor whether another device (in this example, a Bluetooth keyboard and/or mouse "KB/mouse") is connected as another Bluetooth device in the group. If no KB/mouse is detected, the audio stream may continue, at 220, to be transmitted over the communication connection using unframed mode. If a KB/mouse is detected, the mode may be automatically changed to stream the audio, at 230, to the HA in an unsegmented, framed mode. Next, at 235, the host may monitor the operational status of the KB/mouse (e.g., whether the KB/mouse enters a low-power mode). If the KB/mouse has not entered a low power mode, the audio stream may continue, at 230, to be transmitted over the communication connection using framed, unsegmented mode. If the KM/mouse has entered a low power mode, the mode may be automatically changed to stream the audio, at 240, to the HA in an unframed mode. Next, at 245, the host may monitor whether the operational status of the KB/mouse changes (e.g., whether the KB/mouse moves so as to exit low-power mode and be in an active state). If the KB/mouse remains in an inactive state, the audio stream may continue, at 240, to be transmitted over the communication connection using unframed mode. If the KM/mouse has entered an active state, the mode may be automatically changed to stream the audio, at 230, to the HA in an unsegmented, framed mode.

Figure 3:
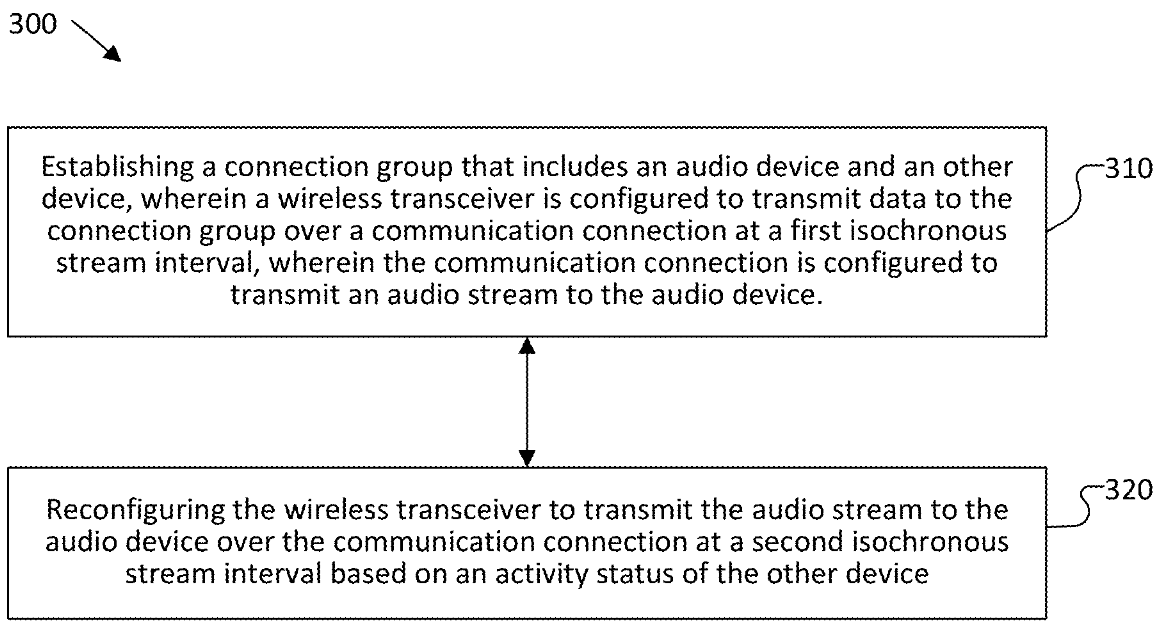
FIG. 3 depicts a schematic flow diagram of a method for automatically switching a mode of the isochronous adaption layer.

FIG. 3 depicts a schematic flow diagram of a method 300 for automatically switching a mode of the isochronous adaption layer. Method 300 may implement any of the features of the automatic switching discussed above, including with respect to FIGS. 1-2.

Method 300 includes, at 310, establishing a connection group that includes an audio device and an other device, wherein a wireless transceiver is configured to transmit data to the connection group over a communication connection at a first isochronous stream interval, wherein the communication connection is configured to transmit an audio stream to the audio device. Method 300 also includes, at 320, reconfiguring the wireless transceiver to transmit the audio stream to the audio device over the communication connection at a second isochronous stream interval based on an activity status of the other device.

In the following, various examples are provided that may include one or more features of the automatic switching described above, including with reference to FIGS. 1-3 above. It may be intended that aspects described in relation to the devices may apply also to the described method(s), and vice versa.

Example 1 is an apparatus including a wireless transceiver configurable to communicate with external devices using a Bluetooth low-energy connection. The apparatus also includes a communication controller configured to establish via the wireless transceiver a connection group that includes a listening device and an other device, wherein the wireless transceiver is configured to transmit data packets to the connection group using a communication connection in a data packet mode. The communication controller is also configured to determine a reconfiguration of the communication connection based on an activity status of the other device within the connection group, wherein the reconfiguration includes changing the data packet mode of the communication connection to a second data packet mode. The communication controller is also configured to cause the wireless transceiver to transmit the data packets over the communication connection in the second data packet mode.

Example 2 is the apparatus of example 1, wherein the connection group includes a Bluetooth low energy isochronous group, wherein the communication connection includes an isochronous adaption layer.

Example 3 is the apparatus of either of examples 1 or 2, wherein the data packet mode includes a framed mode and the second data packet mode includes an unframed mode.

Example 4 is the apparatus of example 3, wherein the framed mode includes data packet transmissions that occur at a first isochronous interval without segmentation, wherein the unframed mode includes data packet transmissions that occur at a second isochronous interval, wherein the first isochronous interval is different from the second isochronous interval.

Example 5 is the apparatus of any of examples 1 to 4, wherein the reconfiguration includes changing an isochronous stream interval between a first isochronous interval and a second isochronous interval.

Example 6 is the apparatus of example 5, wherein the first isochronous interval includes 7.5 ms and the second isochronous interval includes 10 ms.

Example 7 is the apparatus of any of examples 1 to 6, wherein the activity status of the other device includes whether the other device is in an idle mode, whether the other device is in a low-power mode, or whether the other device is scheduled for communicating data packets over the communication connection.

Example 8 is the apparatus of any of examples 1 to 7, wherein the communication controller is configured to wait to cause the wireless transceiver to transmit the data packets over the communication connection in the second data packet mode until after an acknowledgement is received from the listening device.

Example 9 is the apparatus of any of examples 1 to 8, wherein the data packets include streaming audio data packets.

Example 10 is the apparatus of any of examples 1 to 9, wherein the listening device includes a hearing aid, a headset, or a speaker.

Example 11 is the apparatus of any of examples 1 to 10, wherein the other device includes a wireless mouse, a wireless keyboard, or other wireless peripheral device.

Example 12 is the apparatus of any of examples 1 to 11, wherein the data packets include audio data packets that have been encapsulated into a protocol data unit (PDU), wherein each of the audio data packets include a service data unit (SDU) of streaming audio data.

Example 13 is the apparatus of any of examples 1 to 12, wherein the communication controller configured to cause the wireless transceiver to transmit the data packets over the communication connection in the second data packet mode includes the communication controller configured to transmit a mode switch indicator to the wireless transceiver to change the communication connection from the first data packet mode to the second data packet mode.

Example 14 is the apparatus of example 13, wherein each packet of the data packets includes a header and a payload, wherein the header includes the mode switch indicator.

Example 15 is the apparatus of example 14, wherein the mode switch indicator of one packet of the data packets is configured to indicate the reconfiguration for a subsequent packet of the data packets.

Example 16 is a non-transitory computer-readable medium including instructions that, when executed, cause one or more processors to establish a connection group that includes an audio device and an other device, wherein a wireless transceiver is configured to transmit data to the connection group over a communication connection at a first isochronous stream interval, wherein the communication connection is configured to transmit an audio stream to the audio device. The instructions also cause the one or more processors to reconfigure the wireless transceiver to transmit the audio stream to the audio device over the communication connection at a second isochronous stream interval based on an activity status of the other device.

Example 17 is the non-transitory computer-readable medium of example 16, wherein the first isochronous stream interval is associated with a framed, unsegmented mode for transmitting data to the other device; wherein the second isochronous stream interval is associated with an unframed mode for transmitting the packet data units of the audio stream over the communication connection.

Example 18 is the non-transitory computer-readable medium of either of examples 16 or 17, wherein the first isochronous stream interval is based on a frame rate of data communications of the other device over the communication connection.

Example 19 is the non-transitory computer-readable medium of any of examples 16 to 18, wherein the second isochronous stream interval is based on a frame rate of the audio stream.

Example 20 is the non-transitory computer-readable medium of any of examples 16 to 19, wherein the instructions that cause the one or more processors to reconfigure the wireless transceiver to transmit the audio stream to the audio device over the communication connection at the second isochronous stream interval includes that the instructions cause the one or more processors to indicate a toggling between the first isochronous stream interval and the second isochronous stream interval via a reserved bit in a header of at least one of the data packets.

While the disclosure has been particularly shown and described with reference to specific aspects, it should be understood by those skilled in the art that various changes in form and detail may be made therein without departing from the spirit and scope of the disclosure as defined by the appended claims. The scope of the disclosure is thus indicated by the appended claims and all changes, which come within the meaning and range of equivalency of the claims, are therefore intended to be embraced.

The invention claimed is:

1. An apparatus comprising:

a wireless transceiver configurable to communicate with external devices using a Bluetooth low-energy connection; and a communication controller configured to:

establish via the wireless transceiver a connection group that includes a listening device and an other device, wherein the wireless transceiver is configured to transmit data packets to the connection group using a communication connection in a data packet mode;

determine a reconfiguration of the communication connection to the listening device based on an activity status of the other device within the connection group, wherein the reconfiguration comprises changing the data packet mode of the communication connection to a second data packet mode; and cause the wireless transceiver to transmit the data packets over the communication connection in the second data packet mode.

2. The apparatus of claim 1, wherein the connection group comprises a Bluetooth low-energy isochronous group, wherein the communication connection comprises an isochronous adaption layer.

3. The apparatus of claim 1, wherein the data packet mode comprises a framed mode and the second data packet mode comprises an unframed mode.

4. The apparatus of claim 3, wherein the framed mode comprises data packet transmissions that occur at a first isochronous interval without segmentation, wherein the unframed mode comprises data packet transmissions that occur at a second isochronous interval, wherein the first isochronous interval is different from the second isochronous interval.

5. The apparatus of claim 1, wherein the reconfiguration comprises changing an isochronous stream interval between a first isochronous interval and a second isochronous interval.

6. The apparatus of claim 5, wherein the first isochronous interval comprises 7.5 ms and the second isochronous interval comprises 10 ms.

7. The apparatus of claim 1, wherein the activity status of the other device comprises whether the other device is in an idle mode, whether the other device is in a low-power mode, or whether the other device is scheduled for communicating data packets over the communication connection.

8. The apparatus of claim 1, wherein the communication controller is configured to wait to cause the wireless transceiver to transmit the data packets over the communication connection in the second data packet mode until after an acknowledgement is received from the listening device.

9. The apparatus of claim 1, wherein the data packets comprise streaming audio data packets.

10. The apparatus of claim 1, wherein the listening device comprises a hearing aid, a headset, or a speaker.

11. The apparatus of claim 1, wherein the other device comprises a wireless mouse, a wireless keyboard, or an other wireless peripheral device.

12. The apparatus of claim 1, wherein the data packets comprise audio data packets that have been encapsulated into a protocol data unit (PDU), wherein each of the audio data packets comprises a service data unit (SDU) of streaming audio data.

13. A device comprising:

a means for communicating with external devices using a Bluetooth low-energy connection;

a means for establishing via the means for communicating a connection group that includes a listening device and an other device, wherein the means for communicating is configured to transmit data packets to the connection group using a communication connection in a data packet mode;

a means for determining a reconfiguration of the communication connection to the listening device based on an activity status of the other device within the connection group, wherein the reconfiguration comprises changing the data packet mode of the communication connection to a second data packet mode; and a means for transmitting the data packets over the communication connection in the second data packet mode.

14. The device of claim 13, wherein the means for transmitting the data packets over the communication connection in the second data packet mode comprises a means for transmitting a mode switch indicator to change the communication connection from the data packet mode to the second data packet mode.

15. The device of claim 14, wherein each packet of the data packets comprises a header and a payload, wherein the header comprises the mode switch indicator, wherein the mode switch indicator of one packet of the data packets is configured to indicate the reconfiguration for a subsequent packet of the data packets.

16. A non-transitory computer-readable medium comprising instructions that, when executed, cause one or more processors to:

establish a connection group that includes an audio device and an other device, wherein a wireless transceiver is configured to transmit data to the connection group over a communication connection at a first isochronous stream interval, wherein the communication connection is configured to transmit an audio stream to the audio device; and reconfigure the wireless transceiver to transmit the audio stream to the audio device over the communication connection at a second isochronous stream interval based on an activity status of the other device, wherein the first isochronous stream interval is based on a frame rate of data communications of the other device over the communication connection.

17. The non-transitory computer-readable medium of claim 16, wherein the first isochronous stream interval is associated with a framed, unsegmented mode for transmitting data to the other device, wherein the second isochronous stream interval is associated with an unframed mode for transmitting packet data units of the audio stream over the communication connection.

18. The non-transitory computer-readable medium of claim 16, wherein the second isochronous stream interval is based on a frame rate of the audio stream.

19. The non-transitory computer-readable medium of claim 16, wherein the instructions that cause the one or more processors to reconfigure the wireless transceiver to transmit the audio stream to the audio device over the communication connection at the second isochronous stream interval comprises further instructions that cause the one or more processors to indicate a toggling between the first isochronous stream interval and the second isochronous stream interval via a reserved bit in a header of at least one of data packet of the audio stream.

* * * * *